United States Patent
Bonham, Jr. et al.

[11] Patent Number: 5,800,666
[45] Date of Patent: Sep. 1, 1998

[54] METHOD AND SYSTEM FOR FORMING AN OPTICAL FIBER MICROLENS

[75] Inventors: Harry B. Bonham, Jr.; Richard E. Lucas, Jr., both of Plano, Tex.

[73] Assignee: Alcatel Network Systems, Inc.

[21] Appl. No.: 726,609

[22] Filed: Oct. 7, 1996

Related U.S. Application Data

[62] Division of Ser. No. 243,142, May 16, 1994, Pat. No. 5,598,493.
[51] Int. Cl.$^6$ ................................. C03C 25/06
[52] U.S. Cl. ................. 156/345; 216/11; 216/24; 216/26; 216/91
[58] Field of Search ................. 216/24, 26, 91, 216/97, 11; 156/345

[56] References Cited

U.S. PATENT DOCUMENTS

| | | | |
|---|---|---|---|
| 4,265,699 | 5/1981 | Ladany | 156/657 |
| 4,469,554 | 9/1984 | Turner | 156/657 |
| 5,011,254 | 4/1991 | Edwards et al. | 350/96.18 |
| 5,101,457 | 3/1992 | Blonder et al. | 385/33 |
| 5,290,398 | 3/1994 | Feldman et al. | 156/651 |
| 5,598,493 | 1/1997 | Bonham, Jr. et al. | 385/33 |

*Primary Examiner*—Robert Kunemund
*Assistant Examiner*—Anita Alanko
*Attorney, Agent, or Firm*—Gray Cary Ware & Freidenrich LLP

[57] ABSTRACT

A method and system for forming microlens (78) on an optical fiber (60) include optical fiber lensing device (10) having lowering mechanism (18) for inserting optical fiber (60) at a predetermined and controlled speed to a predetermined depth in oil-acid bath having oil layer (62), acid layer (64), and boundary (68) between oil layer (62) and acid layer (64). The next step is to etch optical fiber (60) at boundary (68) by forming meniscus (66) around optical fiber (60) to selectively and controllably form on optical fiber (60) a microlens (78) having a predetermined shape, preferably a hyperbolic shape. The etching includes the steps of first tapering optical fiber (60) to a shape determined by the distance that optical fiber (60) is first inserted into acid layer (64). The etch step further chemically mills microlens (78) on optical fiber (60) to the predetermined shape by controlling the etch time and position of optical fiber (60) relative to boundary (68) for etching optical fiber (60) at boundary (68).

19 Claims, 3 Drawing Sheets

METHOD AND SYSTEM FOR FORMING AN OPTICAL FIBER MICROLENS

CROSS REFERENCE TO RELATED APPLICATIONS

This application is a divisional application of U.S. application Ser. No. 08/243,142, filed May 16, 1994 and entitled "Method and System for forming an Optical Fiber Microlens," now U.S. Pat. No. 5,598,493.

TECHNICAL FIELD OF THE INVENTION

The present invention relates to a technique for fabricating an optical fiber with a lensed end face and, more particularly, method and system for forming an optical fiber microlens to a fiber lensing technique that uses precisely-controlled wet chemical etching to form the desired microlens shape.

BACKGROUND OF THE INVENTION

The usefulness of a fiber optic transmitter module depends in part on the ability of the module to transfer light from the energy source into the optical fiber that transmits the light. Forming a microlens on the end of the fiber, i.e., a "microlens", improves transfer of light from the energy source to the optical fiber. There are limitations, however, in the current or known methods for forming such microlenses. For example, while many techniques exist to manufacture microlenses, none has both the flexibility to make a number of different types or shapes of microlenses and the ability to be used in a large-scale production environment. That is, while some techniques provide flexibility in microlens configurations, other techniques may be scaled for production. Present methods include techniques known by the following names: (1) draw and lensing; (2) mechanical machining; (3) laser machining; (4) bubble etch and lensing; and (5) taper etch and lensing.

In the draw and lensing technique, forming a microlens begins by attaching a weight or otherwise applying a pulling force on the fiber and then placing the fiber in an arc. The arc softens the fiber so that the pulling force may draw it to a taper. After fiber separation, the arc melts the tip to form a hemispherical microlens. A limitation of this technique is that it can only form hemispherical microlenses. This technique is also very difficult to control. Room air currents, mechanical vibrations, and other external factors affect the microlens formation. The inability to control these factors therefore severely limits the draw and lens technique in mass production facilities.

Mechanical machining entails machining, grinding, and polishing the optical fiber lens end. Mechanical machining provides flexible microlens configurations, but is excessively expensive. As a result, mechanical machining is not feasible for mass production processes.

Laser machining is similar to mechanical machining, but uses a laser such as a $CO_2$ laser to ablate the fiber end. The laser machining technique can make a variety of microlens configurations and is less expensive than mechanical machining. This technique, however, has little use in a mass production environment. This is because each fiber must be fixed in a rotating stage and individually machined. The need to carefully process each fiber, therefore, makes volume production using laser machining impractical.

The bubble etch and lensing technique is a two-step process that etches the fiber to a point and then places the end of the fiber in an arc to form a hemispherical microlens.

In the bubble etch and lensing technique, the optical fiber is etched in a bubble enclosure to keep hydrofluoric acid fumes from attacking the fiber above the taper. This method, like the laser machining method, possesses the problems of being labor intensive, difficult to control, having a low production yield, and only able to produce hemispherical microlenses.

In the taper etch and microlensing technique, the fiber is etched to a point using an oil boundary method instead of the bubble enclosure that the bubble etch and lensing technique uses. The fiber microlens is formed using an electric arc. While this process is easy to control and to scale for production volumes, the only microlens configuration that this process permits is hemispherical microlenses. It has been shown, however, that an ideal optical fiber microlens should have a hyperbolic microlens. This is because the ideal optical fiber lens should have an aperture large enough to collect all laser radiation. It should have a focal length that matches the laser and fiber modes. It also should be free of spherical aberrations. Moreover, an ideal optical fiber microlens should be coated to eliminate Fresnel reflections. H. M. Presby and C. A. Edwards in an AT&T Bell Laboratories "Electronic Letter" dated Mar. 12, 1992 illustrate that in order to meet these requirements the ideal shape for a microlens of a optical fiber cable is hyperbolic. None of the above described methods, however, provide a hyperbolic optical fiber microlens in a process that has significant application in a manufacturing environment.

Accordingly, there is a need for a method to produce an optical fiber lens that can produce a hyperbolic microlens in high production volumes.

There is a need for a method for producing an optical fiber microlens that accommodates large production volumes and that is flexible for a variety of microlens configurations.

There is a further need for a method for producing an optical fiber microlens that is easy to perform and to control and that manufacturing environment air currents, mechanical vibrations, or other external factors do not adversely affect.

SUMMARY OF THE INVENTION

The present invention, accordingly, provides a method for forming a microlens on an optical fiber that addresses and overcomes limitations and disadvantages associated with existing methods for forming a microlens.

According to one aspect of the invention there is provided a method for forming a microlens on an optical fiber that includes the steps of inserting the optical fiber at a predetermined controlled speed to a predetermined depth in a bath having an oil layer, an acid layer, and a boundary between the oil layer and the acid layer. The technique etches the optical fiber at the boundary by forming a meniscus around the optical fiber to selectively and controllably form a microlens having a predetermined shape on the optical fiber. Movement of a precision stepper motor with which the optical fiber associates controls the predetermined shape of the microlens. A processor executes a set of instructions to control the stepper motor speed and, thereby, control the form of the optical fiber. The method of the present invention, thus, uses an oil-acid meniscus to selectively etch the ends of the optical fiber. Because of the variety in possible motor speeds and speed changes, the method of the present invention permits forming precise microlenses that may have a variety of configurations.

A technical advantage of the present invention is that it allows forming practically any convex or outwardly angled microlens configuration through precisely programming the operation of the stepper motor. In addition, the technique is easily scaled to volume production and is virtually independent of operator skill. In implementing the present invention, for example, optical fiber cables are first cut to length and the cable's organic buffer is stripped to expose the optical fiber for etching. The fibers are then placed side by side in a fixture. The fibers are preferably perpendicular to the fixture with the stripped ends adjacent. The number of fibers simultaneously processed is a function only of the fixture size. The fixtured fibers are set on and attached to a platform that is mechanically attached to the programmable stepper motor. The stepper motor lowers the fixtured fibers into a bath of hydrofluoric acid and oil according to commands from a process control computer.

Since the stepper motor motion is controlled by a computer, the amount of fiber exposed to the acid may be precisely controlled. The stepper motor resolution, for example, may be as small as 0.1 micron. The acid bath, in one embodiment, is 48% hydrofluoric acid with approximately 0.25 inches of oil covering the acid's surface. The acid chemically machines the fiber. The oil serves as an etch stop that prevents hydrofluoric acid fumes from attacking the fiber above the bath. Etching to form the desired microlens takes place in the meniscus that surrounds the cable at the acid-oil boundary.

An important point to notice is that since the height of the meniscus is proportional to the diameter of the fiber, the fiber is etched to a cone with a well-controlled included angle. The included angle is a function of relative densities and surface tensions of the selected acid and oil. The included angle is, consequently, extremely repeatable. After etching to a taper, the stepper motor lowers the fiber by a precise distance into the acid. This precise distance may be measured in tenths of microns. The fiber is then etched for a predetermined time that the stepper motor control algorithm controls. Next, the fiber is lowered again. This procedure continues until the microlens has the desired microlens configuration. Finally, the optical fiber is removed from the etchant. The optical fiber is then rinsed first of all in water and secondly in alcohol. The process of the present embodiment is easy to perform and to repeat, easy to scale to production volumes, and capable of forming a variety of microlens configurations.

Another technical advantage of the present invention is that the method may apply to more than forming an optical fiber microlens. For example, any thin rod, whether a flexible fiber or a thin rigid member may have an end formed according to the present method. For further example, a probe tip for which a desired end is necessary may be formed using the present invention. These, and other applications, of the precisely controlled tip forming technique that has the ability to form a shape according to various mathematical control instructions are within the scope of the present invention.

BRIEF DESCRIPTION OF THE DRAWINGS

The invention and its modes of use and advantages are best understood by reference to the following description of illustrative embodiments when read in conjunction with the accompanying drawings, wherein.

DETAILED DESCRIPTION OF THE INVENTION

The illustrative embodiments of the present invention are best understood by referring to the FIGS., wherein like numerals are used for like and corresponding parts of the various components.

Figures 1, 2A, 2C:
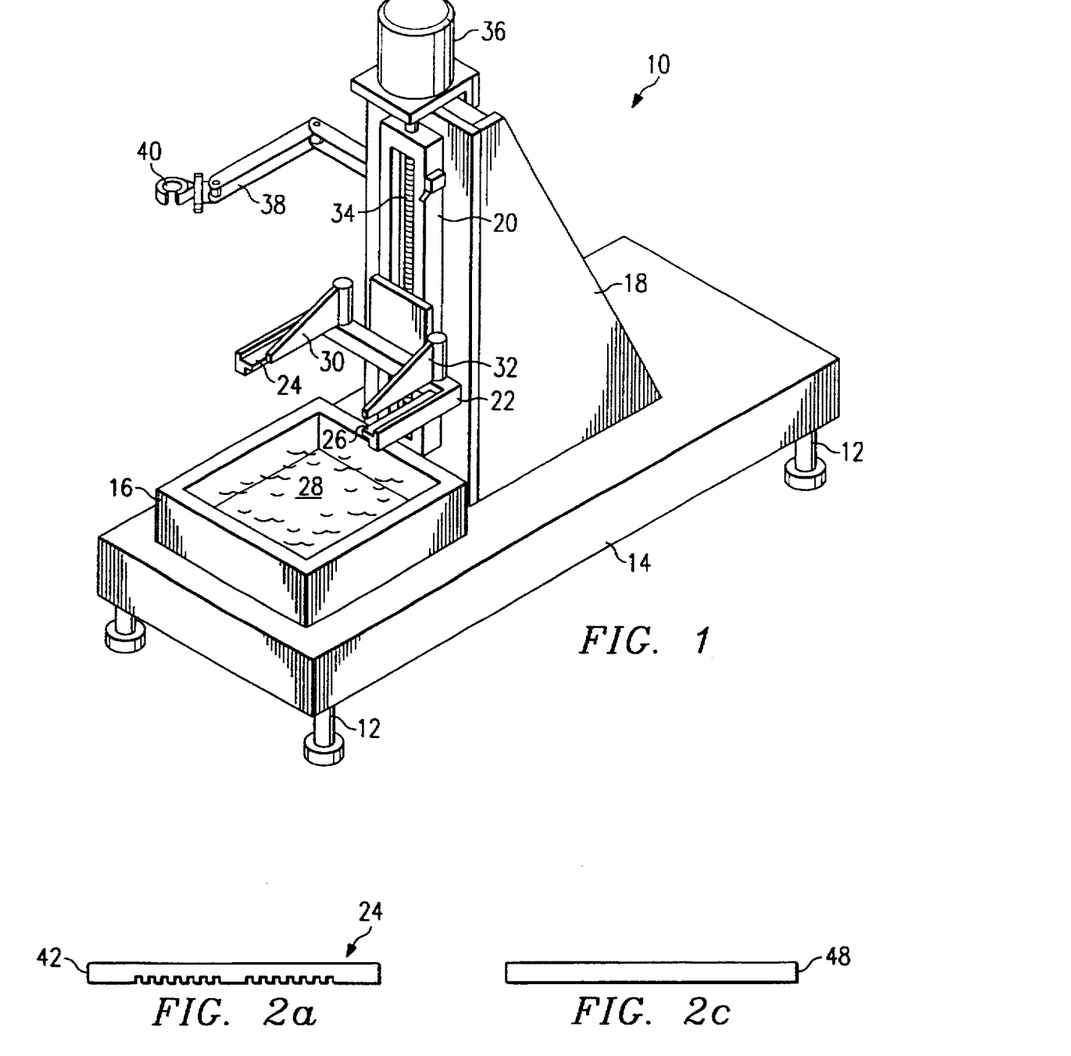
FIG. 1 illustrates a device for inserting a optical fiber into an acid-oil bath to form the microlens of the present embodiment.
FIGS. 2a through 2d provide plan views of a bar clamp for holding numerous optical fibers that may be inserted into the acid-oil bath of the present embodiment.

FIG. 1 shows optical fiber microlens forming device 10 that mounts to pedestals 12 on base 14. On base 14 are tank 16 and lowering mechanism 18. Lowering mechanism 18 is perpendicular to base 14 and includes lowering gear 20 to which lowering bar 22 attaches. Lowering bar 22 holds two bar clamps 24 and 26. Bar clamps 24 and 26 are parallel to tank 16 which contains an acid-oil multi-layer bath 28. On lowering bar 22 stabilizing arms 30 and 32 maintain clamps 24 and 26 in a horizontal position. Lowering bar 22 engages lowering gear 20 for raising and lowering bar clamps 24 and 26. Lead screw 34 connects to the rotating shaft of stepper motor 36 to control the vertical position of lowering bar 22. Stepper motor 36, therefore, controls the vertical placement of lowering bar 22. A computer including a program having instructions to form a microlens of the desired shape, as described in more detain herein, controls the operation of stepper motor 36. Lamp holder 38 permits control of clamp 40 to position bar clamps 24 and 26 within lowering bar 22.

Figure 2B:
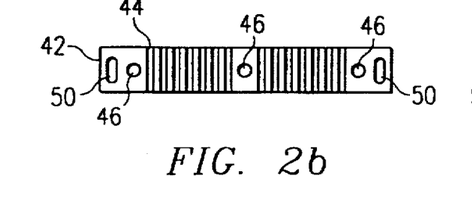
Figure 2D:
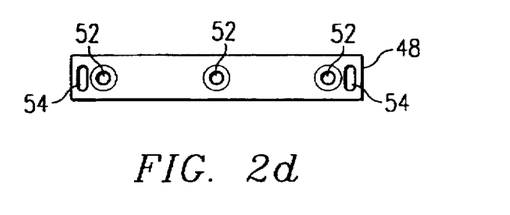

FIGS. 2a through 2d show various views of bar clamps 24 or 26. In particular, FIGS. 2a and 2b show horizontal and vertical long side views of optical fiber engaging side 42 of bar clamp 24, for example. Optical fiber engaging side 42 is straight and includes grooves 44 for receiving optical fibers. Optical fiber engaging side 42 includes thread holes 46 that permit securing optical fiber engaging side 42 with opposite side 48 that FIG. 2b shows, likewise in horizontal and vertical long side views. Optical fiber engaging side 42 also includes slots 50 that permit mounting bar clamp 24 on lowering bar 22. As FIGS. 2c and 2d show, opposite side 48 is flat and does not have grooves 44 that optical fiber engaging side 42 possesses. Like optical fiber engaging side 42, however, opposite side 48 includes holes 52 for receiving a fastening bolt for clamping to engaging side 42 and slots 54 for positioning the resulting bar clap 24 within lowering bar 22.

Figures 3A, 3B, 3C, 3D, 4:
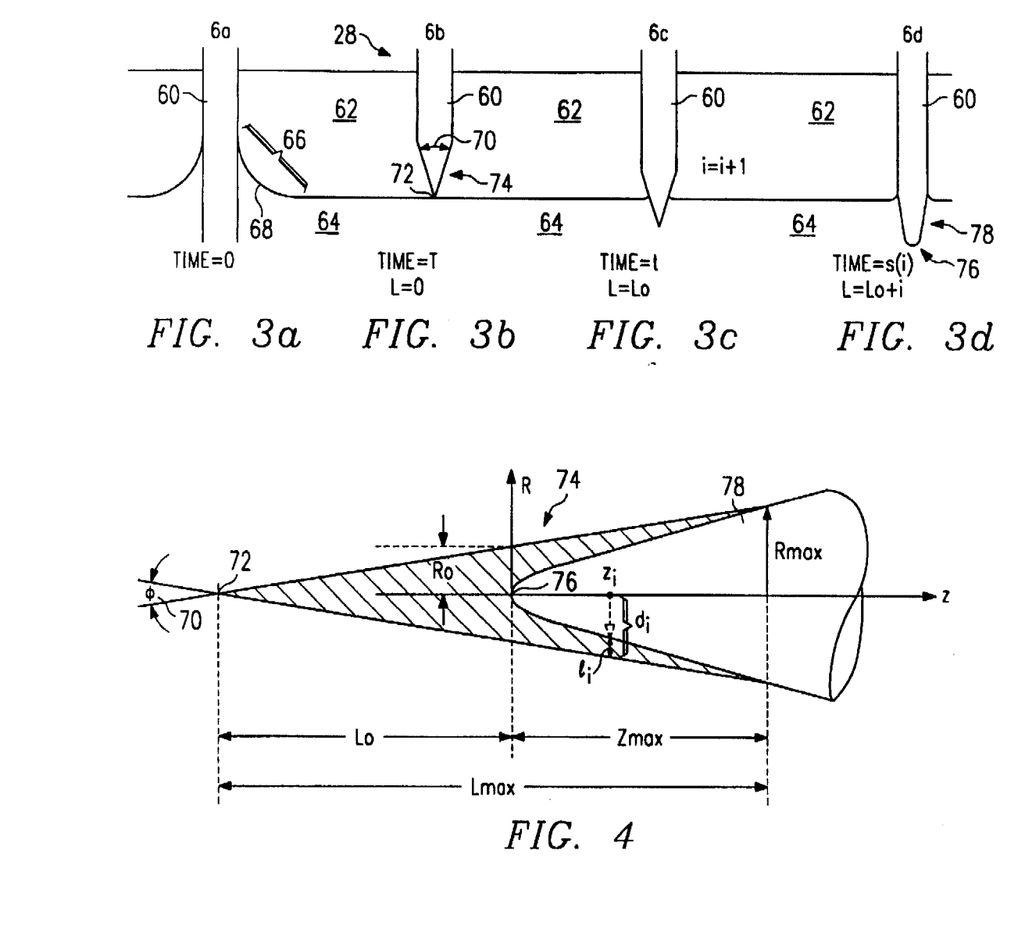
FIGS. 3a through 3d illustrate the microlens forming steps of the present embodiment.
FIG. 4 provides a conceptual diagram of an optical fiber microlens to illustrate the steps of a hyperbolic microlens.

FIGS. 3a-3d illustrate progressive steps of the present method. Beginning at FIG. 3a, optical fiber 60 is inserted into oil-acid bath 28 that includes oil layer 62 and acid layer 64. As FIG. 3a illustrates, optical fiber 60 is inserted into oil-acid bath 28 so that meniscus 66 forms. Meniscus 66 coats optical fiber 60 with acid 64 and etches optical fiber 60 at oil-acid boundary 68. As the acid in meniscus 66 eats away fiber 60, it changes in height and forms included angle 70 in fiber 60. Included angle 70 having point 72 forms taper 74 of optical fiber 60, as FIG. 3b shows. In FIG. 3c, optical fiber 60 is then moved in relation to acid 64 to a predetermined point on taper 74 so that, as FIG. 3d illustrates, rounded end 76 results. Thereafter, according to FIG. 3d, optical fiber 60 is reinserted into acid 64 to finish and form hyperbolic microlens 78. There may be other movements of fiber 60 relative to acid 64 that form desired shapes for microlens 78. These movements correspond to various mathematical expressions as described below. In FIGS. 3a through 3d, therefore, optical fiber 60 is etched by meniscus 66 that oil layer 62 forms. This procedure first forms taper 74 and then chemically mills the microlens to the desired shape such as hyperbolic taper 78. The height of the meniscus 66 determines the magnitude of included angle 70 of taper 74, as FIG. 3b illustrates.

To determine the location of the oil-acid boundary 68, two probes attach to a conductance meter (not shown) that associates with lowering bar 22. When conductance abruptly increases, this means that the two probes are in acid layer 64 and that optical fiber 60 is in position to form taper 74. After forming taper 74, stepper motor 36 lowers optical fiber 60 into acid layer 64 a predetermined distance according to the desired location of the microlens on taper 72. Stepper motor 36 of the present embodiment lowers optical fiber 60 in 0.1 micron increments, stopping to allow etching after each step, as FIG. 3d shows. A computer controls the procedure with the programming including equations that calculate the desired location of the microlens on the taper and the required etch times for each step. These are discussed in the text associated with FIG. 4.

FIG. 4 shows the progressive formation of hyperbolic microlens 78. As a result of the process of FIGS. 3a and 3b, taper 74 results in a conical section having included angle 70 and point 72. After forming taper 74, precision control of inserting optical fiber 60 achieves rounded end 74 as part of hyperbolic microlens 78. The following discussion explains why the hyperbolic shape of microlens 78 is preferable over other forms of microlens. Note, however, that although there may be other ways to show why a hyperbolic microlens form on optical fiber is preferable, the following explanation suffices for the present purposes.

To completely define the process of forming optical fiber microlens 78 in the present embodiment, equations for etch times, fiber positions are derived and herein below described. Thus, its useful to determine etch taper time, T, the distance, $L_0$, to lower optical fiber 60 into acid 64, the maximum length, $L_{max}$, of taper 74, the incremental time at each position, s(i) for each increment. The following discussion describes one method of determining the value of these parameters. There may be other ways to determine these parameters based on the desired microlens configuration, the geometry of the optical fiber microlens, and other parameters that may be relevant to the present embodiment.

Calculating the Etch Taper Time, T: Previous studies establish the etch rate of optical fiber 60 in 45% hydrofluoric acid to be 3.48 µM/min. The diameter of such fiber is 125 µM. Thus, minimum etch time is 35.92 minutes or 2155 seconds. This time may be extended to provide a desired process margin. In general, however, if D is the fiber diameter and Q the etch rate, then the minimum etch time, T, has the following expansion:

$$T = \frac{D}{Q} \approx 2155 \text{ seconds} \quad (1)$$

Since the process of etching a taper automatically stops when the acid-oil meniscus drops to zero (i.e., oil-acid boundary 68 flattens), the time that Equation (7) yields is only a minimum. For the implementation 2400 seconds of the present embodiment was chosen.

Calculating the Location, $L_0$, of Microlens 78 on Taper 74: The location, $L_0$, of microlens 78 on fiber taper 74 depends on the radius, $R_{max}$, of the desired microlens 78. See FIG. 4. To assure that all light reaching microlens 78 travels into the fiber core, $R_{max}$ should be as a minimum equal to radius of the fiber core, i.e., C/2, where C is the core diameter. For the present embodiment, for example, $R_{max}$ was arbitrarily chosen to be 20% larger than the core radius. Using these restrictions, the following relationship is preferable:

$$R_{max} = 0.6 \times C \quad (2)$$

In FIG. 4, the cross hatched area represents the part of optical fiber 60 in taper 74 etching remove during formation of microlens 78. The distance $L_0$ is the initial distance that the fiber is lowered into acid to locate microlens 78 on the fiber. By inspection of FIG. 4, $$L_0 = L_{max} - Z_{max} \quad (3)$$

$L_{max}$ may be determined from the etch taper and $R_{max}$ and $Z_{max}$ may be determined from the desired $R_{max}$ and from the Equation that describes the desired microlens shape. Thus:

$$L_{max} = \frac{R_{max}}{\tan\left(\frac{\theta}{2}\right)}, \text{ and} \quad (4)$$

$$Z_{max} = a\sqrt{\left(1 + \frac{R^2_{max}}{b^2}\right)} - a$$

Consequently, from Equations (9) and (10):

$$L_0 = \frac{R_{max}}{\tan\left(\frac{\theta}{2}\right)} + a - a\sqrt{\left(1 + \frac{R^2_{max}}{b^2}\right)} = \quad (5)$$

$$\frac{0.6C}{\tan\left(\frac{\theta}{2}\right)} + a - a\sqrt{1 + \frac{0.36C^2}{b^2}}$$

Where, a and b are known functions of core index of refraction and desired microlens focal length, respectively.

Calculating the Incremental Etch Time, s(i), for Each Interval, i: Let $d_i$ be the thickness of optical fiber 60 material etching at $z=z_i$ removes. The radius of microlens 78 and the radius of taper 74 are as follows:

$$\text{microlens 78 radius} = l_i = \frac{a}{b}\sqrt{z_i(z_i + 2a)} \text{ ; and} \quad (6)$$

$$\text{taper 74 radius} = F_i = (z_i + L_0)\tan\left(\frac{\theta}{2}\right) \quad (7)$$

From these relationships, the distance $d_i$ etched has the value $d_i = F_i - l_i$ and the time, $t_i$, to etch optical fiber 60 this distance $$t_i = \frac{d_i}{Q}.$$

Now, Q is the fiber etch rate in µM/min. From Equations (6) and (7), $$t_i = \frac{z_i + L_0}{Q}\tan\left(\frac{\theta}{2}\right) - \frac{b}{aQ}\sqrt{z_i(z_i + 2a)}, \text{ for } i = 0 \text{ to } n \quad (8)$$

Let x be the step distance of stepper motor 36 in µM, then it is possible to calculate n as:

$$n = \left[ \frac{Z_{max}}{X} \right], \text{ and } z_i = i * x \quad (9)$$

Since n is an integer, it is preferable the brackets around $Z_{max}/X$ mean that the non-integer real number value that Equation (15) produces is rounded to the next higher integer.

$$t_i = \frac{x_i + L_0}{Q} \tan\left(\frac{\Theta}{2}\right) - \frac{b}{aQ} \sqrt{x_i(x_i + 2a)}, \quad (10)$$

$$i = 0 \text{ to } \frac{Z_{max}}{x}$$

Equation (10) defines an appropriate etch time, $t_i$, for any i to etch from taper 74 fiber to microlens 78. Since optical fiber 60 is lowered into acid 68, the material etched in increment i has been previously etched along with the material in increment i−1. If s(i) is the incremental etch time at step i, then $$s(i) = t_i - t_{i-1} - t_{i-2} - \ldots - t_0$$

In general, therefore, the incremental etch times s(i) (i=1, . . . , n) are:

$$S(i) = \sum_{k=i}^{n} (-1)^{k-i} t_k \quad i = 0 \text{ to } \frac{Z_{max}}{x} \quad (11)$$

Figure 5:
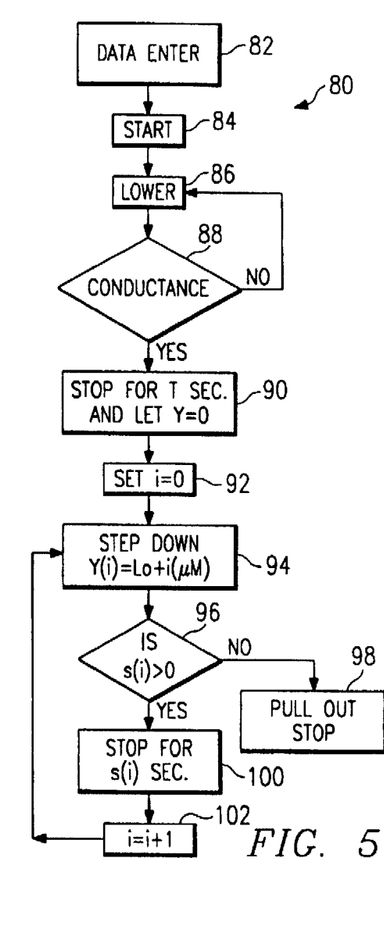
FIG. 5 illustrates a flow diagram exemplary of one embodiment of the present invention.

Having derived the above parameters, it is possible to precisely control stepper motor 36 so that it produces the desired microlens 78 shape. FIG. 5 describes an exemplary process for this purpose.

FIG. 5 shows flow chart 80 that defines a procedure for forming microlens 78 of the present embodiment. Beginning with flow chart 80 the data enter step 82 is the step of first entering data for the desired microlens 78 shape. After enter data step 82, process control of the present embodiment begins at starts step 84. At lower step 86, stepper motor 36 lowers bar clamps 24 and 26 that have in them many optical fibers 60 in the direction of acid-oil bath 28. Optical fibers 60 first enter oil layer 62 and proceed to acid layer 64. At step 88 a query occurs of whether there is a significant increase in the conductance for the two conductance probes. If not, lowering continues by program control returning to lower step 86. If the conductance has changed, then program flow goes to stop step 90 where the process stops for T seconds and sets a variable Y equal to 0 (T equalling the etch taper time and Y equalling the distance that fiber 60 lowers into acid layer 64). Then a counter is set to 0 at initialize step 92.

At step down step 94, precise movement of optical fiber 60 begins. Stepper motor 36 controls the position of optical fiber 60 by responding to control signals from the controlling computer. The controlling computer produces these signals in accordance with the control instructions that flow chart 80 describes, as well as the data from data enter step 82. The formula established in connection with FIG. 4, for example, delineates time and optical fiber 60 positions for forming the desired microlens 78. At query 96, a test of whether optical fiber 60 is to remain in its current position for a predetermined non-zero time, s(i), occurs. That is, if s(i) is not greater than zero, then it is time to pull out optical fiber 60 from bath 28 and stop the process. Program flow, therefore, goes to stop step 98. If s(i) is greater than zero, then optical fiber 60 is stopped for s(i) seconds at its present position according to stop step 100. Counter step 102 then increments the program. Program flow then returns to step down block 94.

Figure 6:
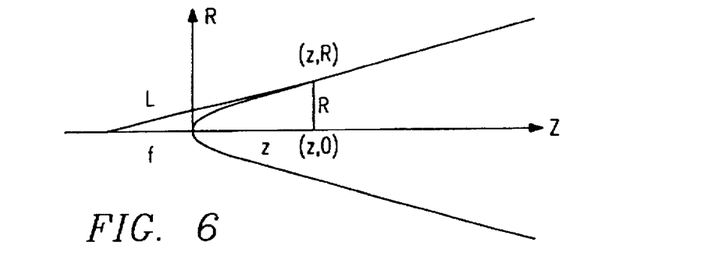
FIGS. 6 through 10 explain the benefits of forming a hyperbolic optical fiber lens according to the present embodiment.

The work of H. M. Presby and C. A. Edwards of AT&T Bell Laboratories published in "Electronic Letter", 12th Mar. 1992 indicates that an ideal microlens should have an aperture large enough to collect all laser radiation, a focal length that matches the laser and fiber modes, be free of spherical aberration, and have a coating that eliminates Fresnel reflections. To meet these requirements the present embodiment provides the solution of an ideal microlens 78 shape having a hyperbolic surface. FIG. 6 details the derivation of this result.

Referring to FIG. 6, the parameters that appear have the following definitions: f is the focal length of the microlens; z is the distance within the microlens at which point the microlens radius is R; L is the distance from the focal point to the microlens at point (z R,); and n (not shown) is the index of refraction for the fiber core.

$$L^2 = R^2 + (f+z)^2 = R^2 + f^2 + z^2 + 2zf \quad (12)$$

To keep the optics in phase at points (0,R) and (z,R), it is necessary to establish the following relationship:

$$L = f = nz. \quad (13)$$

This means, from Equation (12) that $$L^2 = f^2 + n^2 z^2 + 2nzf \quad (14)$$

The Equation (14) relationship produces the result:

$$z^2 + \frac{2f(n-1)}{n^2 - 1} - \frac{R^2}{n^2 - 1} = 0 \quad (15)$$

By completing the square in Equation (15) and setting:

$$a = \frac{f}{n+1}; \text{ and} \quad (16)$$

$$b = \sqrt{\frac{n-1}{n+1}}, \quad (17)$$

the following relationships are formed:

$$1 = \frac{(z+a)^2}{a^2} - \frac{R^2}{b^2}, \quad (18)$$

$$R = \frac{a}{b}\sqrt{z(z+2a)},$$

$$Z = a\sqrt{\left(1 + \frac{R^2}{b^2}\right)} - a$$

Which is the equation for a hyperbola with the following asymptotes:

$$\pm \frac{b}{a} = \pm \sqrt{(n^2 - 1)} \quad (19)$$

Figure 7:
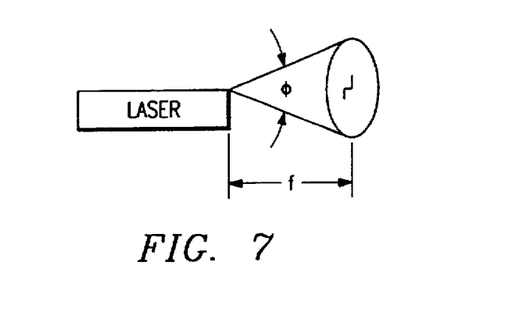
Figure 8:
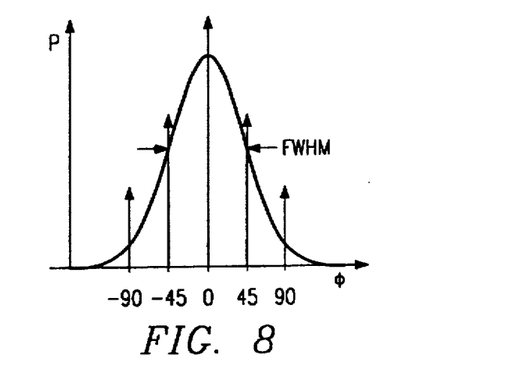

Equations (17), (18), and (19) completely describe microlens 78 of the present embodiment in terms of the desired focal length, f, and the index of refraction of the fiber core, n. The index of refraction is not a variable, but focal length can be selected as a compromise between manufacturability and maximizing coupling efficiency. Forming assures that light arriving at the fiber core will be in phase, providing microlens to laser distance is focused. Since light from the laser is divergent, only that portion arriving on the fiber core will be coupled into the fiber. Fiber core diameter, laser output distribution, and manufacturing capability are variables that define and optimize microlens focal length. Light from a chip laser is distributed Guassian from a normal to its facet, as shown in FIGS. 7 and 8.

The following discussion explains the laser output distribution applicable to the present embodiment. With C equal to the diameter, the core area is:

$$A_c = \pi \frac{C^2}{4} \quad (20)$$

The cross sectional area of light leaving the laser is:

$$A_L = \pi f^2 \tan^2\left(\frac{\Phi}{2}\right) \quad (21)$$

Since all light arriving in the core is in phase, the expected coupling efficiency is:

$$\eta = \frac{A_c}{A_L} = \frac{C^2}{4f^2\tan^2\left(\frac{\Phi}{2}\right)} \quad (22)$$

The Equation (22) assumes that all of the light arriving at microlens 78 couples into optical fiber 60. Fresnel reflections reduce the coupled light to:

$$\eta = \frac{C^2}{4f^2\tan^2\left(\frac{\Phi}{2}\right)} \times \left(1 - \frac{(n-1)^2}{(n+1)^2}\right) \quad (23)$$

Since the light that a laser emits follows a Guassian distribution, all of the light will not strike microlens 78. As can be seen in FIG. 8, the width of light distribution is defined as the Full Width Half Maximum or FWHM light. FWHM is equivalent to two standard deviations. Thus, 68% of light output is enclosed within FWHM and 95% of the laser's output is within 1.96×FWHM. If FWHM=Θ, to assure that 95% of light arrives at microlens 78, then φ=Θ×2 must be satisfied.

$$\eta = \frac{.95C^2}{4f^2\tan^2(\Theta)} \times \left(1 - \frac{n-1)^2}{(n+1)^2}\right); \quad (24)$$

$$\eta \leq 95 \times \left(1 - \frac{(n-1)^2}{(n+1)^2}\right) \text{ in \%}$$

Figure 9:
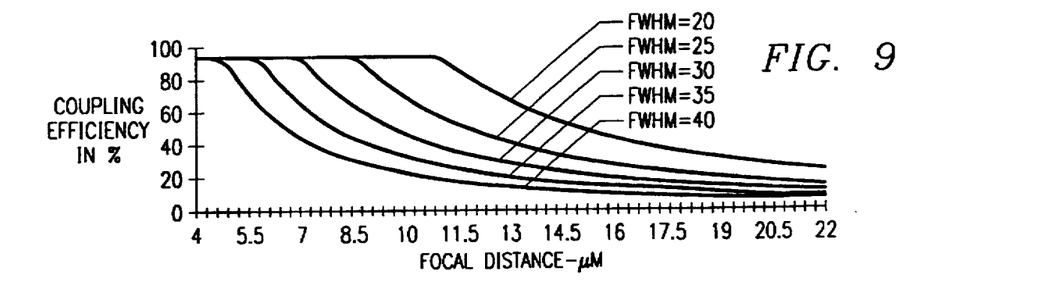

FIG. 9 illustrates the relationship between coupling efficiency and focal length.

Examination of Equation (28), shows that maximum coupling occurs when:

$$f \leq \frac{C}{2\tan(\Theta)} \quad (25)$$

Figure 10:
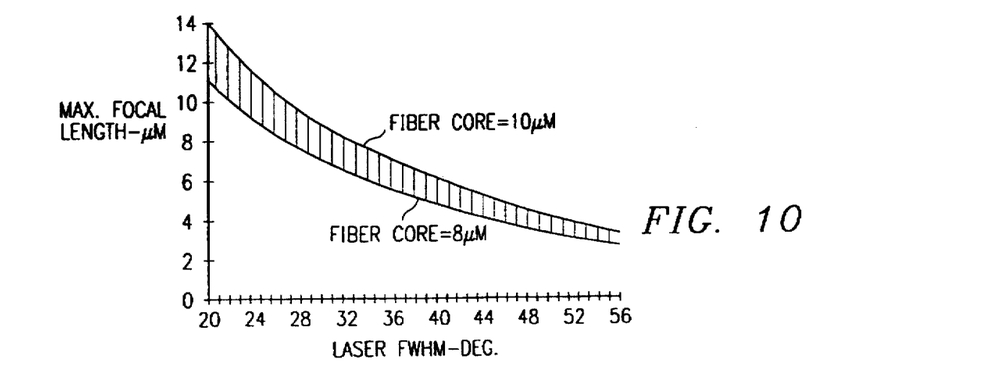

This Equation (27) is particularly interesting, since it relates microlens, fiber, and laser properties. The relationship is plotted below in FIG. 10. Typically, FWHM is less than 35 degrees, and optical fiber 60 effective core diameter is about 9 μM. For these conditions, coupling efficiency is maximized for a microlens focal length is about 6.4 μM. The selection of focal length is a compromise between manufacturing capability and coupling needs. The shorter focal lengths required for high coupling efficiency require much more care during alignment, to prevent laser damage. A 6 μM spacing between laser and fiber is practical for many applications since alignment and fiber anchoring are facilitated by automated processes.

$$f=6 \quad (26)$$

Using 6 μM for focal length and 1.471 for the index of refraction, Equations (16) and (17) yield, $$a=2.428 \text{ and } b=2.620 \text{ [uM]} \quad (27)$$

and Equations (18) and (19) yield a complete definition for microlens 78.

A technical advantage of the present invention is that it allows, through programming the operation of the stepper motor 36, formation of practically any microlens 78 configuration. In addition, the technique of the present embodiment is easily scaled to volume production and is virtually independent of operator skill. In implementing the present embodiment, for example, optical fibers 60 are first cut to length and the fiber organic buffer is stripped to expose the optical fiber for etching. Optical fibers 60 are then placed side by side in bar clamps 24 and 26. Optical fibers 60 are preferably perpendicular to oil-acid bath 28 with the stripped ends adjacent in bar clamps 24 and 26. The number of fibers simultaneously processed is a function only of the size of bar clamps 24 and 26 and optical fiber lensing device 10.

A computer driven or controlled stepper motor 36 precisely controls the amount of each optical fiber 60 that is exposed to acid layer 64. The resolution of stepper motor 36, for example, may be as small as 0.1 micron. Acid bath 64, in one embodiment, is 48% hydrofluoric acid with oil layer 62 having a depth of approximately 0.25 inch. Acid in acid layer 64 chemically machines optical fiber 60. Oil layer 62 serves as an etch stop that prevents fumes from acid layer 62 from attacking optical fiber 60 above oil-acid bath 28. Etching to form microlens 78 takes place in meniscus 66 at oil-acid boundary 68.

An important observation associated with the present embodiment, is that since the height of meniscus 66 is proportional to the diameter of optical fiber 60, optical fiber 60 is etched to taper 72 that has well-controlled included angle 70. Included angle 70 is a function of relative densities and surface tensions of the acid in acid layer 62 and oil in oil layer 64. As a result, included angle 70 is extremely repeatable. After etching optical fiber 60 to taper 72, stepper motor 36 lowers optical fiber 60 a precise distance into acid layer 62. This precise distance as described above may be measured in tenths of a micron. Optical fiber 60 is then etched for a predetermined time T that stepper motor 36 control instructions provide. Next, optical fiber 60 is lowered again into oil-acid bath 28. This procedure continues until microlens 78 has the desired configuration. Finally, optical fiber 60 is removed from the etchant and rinsed first in water and then in alcohol. This process is easy to perform and to repeat, easy to scale to production volumes, and capable of forming a variety of microlens configurations.

In summary, the present embodiment provides a method and apparatus for forming microlens 78 on optical fiber 60 that includes the steps of inserting optical fiber 60 at a predetermined controlled speed to a predetermined depth in oil-acid bath 28 which includes oil layer 62, acid layer 64, and boundary 68 between oil layer 62 and the acid layer 64. Next steps are to etch optical fiber 60 at boundary 68 by forming around optical fiber 60 meniscus 66 to selectively and controllably form microlens 78. The etching step includes tapering the optical fiber to taper 74 that is determined by the distance that optical fiber 60 is first inserted into acid layer 64. The etch step further includes the step of chemically milling microlens 78 on optical fiber 60 to a predetermined shape by controlling the rate of vertically positioning optical fiber 60 relative to acid layer 64 and, thereby, controlling the rate of etching optical fiber 60.

ALTERNATIVE EMBODIMENTS

In one alternative embodiment of optical fiber lensing device 10, for example, there may be more than two bar clamps 24 and 26. Moreover, there may be more than one stepper motor 36 for each oil-acid bath 28. Also, hemispherical lenses, conical lenses, as well as, parabolic or other shapes of lenses may be formed using the present embodiment. There may also be changes to the various steps of the control program for stepper motor 36. Another alternative embodiment contemplates use of the present invention in forming a structure other than an optical fiber microlens. For example, any thin rod, whether a flexible fiber or a thin rigid member may have an end formed according to the present method. For further example, a probe tip for which a desired end is necessary may be formed using the present invention. These, and other applications, of the precisely controlled tip forming technique that has the ability to form a shape according to various mathematical control instructions are within the scope of the present invention.

There are any number of other alternatives or changes in the design of optical fiber lensing device 10 and the steps of the present embodiment which may be readily apparent to one of ordinary skill in the art. Such alternatives may not be employed in the device of the preferred embodiment for any number of reasons, such as costs and performance considerations, size constraints, availability of materials, arbitrary design decisions, and the like. A number of these alternatives have been mentioned above. However, it is felt worthwhile to mention several other alternatives here for purpose of example of such alternative embodiments. This is, of course, done without limitation of other embodiments which may be equally obvious to one of ordinary skill in the art, but are not mentioned here because of time and space constraints. Thus, the invention is intended to be limited only by the claims which are meant to cover such obvious alternatives and deviations from the present embodiment.

What is claimed is:

1. A system for forming a microlens on an optical fiber, comprising:
    a container for containing a bath, said bath comprising an oil layer, an acid layer, and a boundary between the oil layer and the acid layer;
    a fiber position control device for inserting the optical fiber at a controlled speed to a depth in said bath to thereby etch the optical fiber at said boundary by forming a meniscus around the optical fiber that selectively and controllably forms a microlens having a shape on the optical fiber;
    wherein said fiber position control device further comprises control circuitry for inserting the optical fiber in the bath according to a mathematical algorithm that describes the shape of the microlens.

2. The system of claim 1, wherein said fiber position control device first permits tapering the optical fiber to a shape determined by the distance that the optical fiber is first inserted into the acid layer, and further permits chemically milling the microlens on the optical fiber to the shape by controlling the rate of etching the optical fiber at the boundary.

3. The system of claim 1, further comprising a precision stepper motor for inserting the optical fiber into said bath.

4. The system of claim 3, wherein said precision stepper motor further comprises a mechanism for inserting the optical fiber into the bath in increments of approximately 0.1 micron.

5. The system of claim 1, wherein said control circuitry further implements said mathematical algorithm to describe a hyperbola and further wherein said control circuitry programmably controls the precision stepper motor to insert the optical fiber in the bath according to said mathematical algorithm to form a microlens having the shape of a three-dimensional hyperbola.

6. The system of claim 1, wherein said control circuitry further implements said mathematical algorithm to describe a parabola and further wherein said control circuitry programmably controls the precision stepper motor to insert the optical fiber in the bath according to said mathematical algorithm to form a microlens having the shape of a three-dimensional parabola.

7. The system of claim 1, wherein said control circuitry further implements said mathematical algorithm to describe a semi-circle and further wherein said control circuitry programmably controls the precision stepper motor to insert the optical fiber in the bath according to said mathematical algorithm to form a microlens having the shape of a three-dimensional hemisphere.

8. The system of claim 1, wherein said control circuitry further implements said mathematical algorithm to describe an angle and further wherein said control circuitry programmably controls the precision stepper motor to insert the optical fiber in the bath according to said mathematical algorithm to form a microlens having the shape of a three-dimensional a cone having an apex defined by the angle.

9. The system of claim 2, wherein said inserting step comprises the step inserting the optical fiber at a controlled speed to a depth in a bath comprising an oil layer, a hydrofluoric acid layer, and a boundary between the oil layer and the hydrofluoric acid layer.

10. A system for forming a microlens on an optical fiber, comprising:
    a bath comprising an oil layer, an acid layer, and a boundary between the oil layer and the acid layer;
    a mathematical algorithm that describes a desired microlens configuration and provides a set of instructions for forming said desired microlens configuration using said bath;
    a programmable stepper motor implementing said mathematical algorithm to lower said optical fiber into said bath to a precise distance for a time that said mathematical algorithm controls to form a microlens with said desired microlens configuration.

11. The system of claim 10, wherein said programmable stepper motor first permits tapering the optical fiber to a shape determined by the distance that the optical fiber is first inserted into the acid layer, and further permits chemically milling the microlens on the optical fiber to the shape by controlling the rate of etching the optical fiber at the boundary.

12. The system of claim 10, wherein said programmable stepper motor further comprises a mechanism for inserting the optical fiber into the bath in increments of approximately 0.1 micron.

13. The system of claim 10, wherein a platform is mechanically attached to said programmable stepper motor.

14. The system of claim 10, wherein said desired microlens configuration is a hyperbolic.

15. The system of claim 10, wherein said desired microlens configuration is parabolic.

16. The system of claim 10, wherein said desired microlens configuration is hemispherical.

17. The system of claim 10, wherein said mathematical algorithm describes an angle and further wherein said programmable stepper motor inserts the optical fiber in the bath according to said mathematical algorithm to form a microlens having the shape of a three-dimensional a cone having an apex defined by the angle.

18. The system of claim 10, wherein said acid layer is a hydrofluoric acid layer.

19. A system for chemically milling an end of a thin rod, comprising:

a bath comprising an oil layer, an acid layer, and a boundary between said oil layer and said acid layer;

a mathematical algorithm describing a desired shape of said end of said thin rod and providing a set of control instructions for forming said desired shape using said bath;

a programmable control device implementing said mathematical algorithm to lower said thin rod into said bath to form a thin rod with said desired shape of said end of said thin rod.

* * * * *